US009676333B2

(12) United States Patent
Makabe

(10) Patent No.: US 9,676,333 B2
(45) Date of Patent: Jun. 13, 2017

(54) VEHICLE CONTROL SYSTEM

(71) Applicant: Fuji Jukogyo Kabushiki Kaisha, Tokyo (JP)

(72) Inventor: Shunsuke Makabe, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 14/521,298

(22) Filed: Oct. 22, 2014

(65) Prior Publication Data
US 2015/0116462 A1 Apr. 30, 2015

(30) Foreign Application Priority Data

Oct. 31, 2013 (JP) .................. 2013-227357

(51) Int. Cl.
H04N 13/02 (2006.01)
H04N 9/47 (2006.01)
H04N 7/00 (2011.01)
H04N 7/18 (2006.01)
B60R 1/00 (2006.01)
(Continued)

(52) U.S. Cl.
CPC ............ B60R 1/002 (2013.01); B60W 30/00 (2013.01); G06K 9/00201 (2013.01); G06K 9/00805 (2013.01); G06K 9/6201 (2013.01); H04N 7/181 (2013.01); H04N 13/0203 (2013.01); B60R 2300/107 (2013.01); B60R 2300/802 (2013.01); B60R 2300/8093 (2013.01)

(58) Field of Classification Search
None
See application file for complete search history.

(56) References Cited

U.S. PATENT DOCUMENTS

2005/0033516 A1* 2/2005 Kawasaki ............ B60R 21/013
701/301
2006/0192660 A1* 8/2006 Watanabe ................ B60R 1/00
340/435
(Continued)

FOREIGN PATENT DOCUMENTS

JP 2001-28056 A 1/2001
JP 2001-41741 A 2/2001
(Continued)

Primary Examiner — Hung Dang
(74) Attorney, Agent, or Firm — McGinn IP Law Group, PLLC.

(57) ABSTRACT

A vehicle control system executes a distance calculation process of detecting, corresponding points between a pair of captured images obtained by stereo-imaging, working out a coordinate shift between the corresponding points as a parallax, and calculating a distance up to each corresponding point based on the parallax; and a representative distance calculation process of dividing a distance image, in which a distance of each corresponding point is represented, into multiple strip regions that partition the image in a vertical direction, and working out, for each strip region, a distance for which a frequency is equal to or higher than a predefined value, as a representative distance. The system further executes a determination process of counting the number of representative distances within a monitoring region, and determining a magnitude relationship between the count value and a threshold value, to determine thereby the presence or absence of reflection.

20 Claims, 12 Drawing Sheets

(51) Int. Cl.
*B60W 30/00* (2006.01)
*G06K 9/00* (2006.01)
*G06K 9/62* (2006.01)

(56) References Cited

U.S. PATENT DOCUMENTS

| | | | |
|---|---|---|---|
| 2012/0229628 A1* | 9/2012 | Ishiyama | H04N 5/23212 348/135 |
| 2012/0242799 A1* | 9/2012 | Saito | G01S 7/4802 348/46 |
| 2013/0259309 A1 | 10/2013 | Sekiguchi | |
| 2014/0169689 A1* | 6/2014 | Ohsawa | G06T 7/0081 382/224 |

FOREIGN PATENT DOCUMENTS

| | | |
|---|---|---|
| JP | 2001-041741 A | 2/2001 |
| JP | 2001-43496 A | 2/2001 |
| JP | 2009-8539 A | 1/2009 |
| JP | 2009-069119 A | 4/2009 |
| JP | 2009-237938 A | 10/2009 |
| JP | 2010-146284 A | 7/2010 |
| JP | 2012-066759 A | 4/2012 |

\* cited by examiner

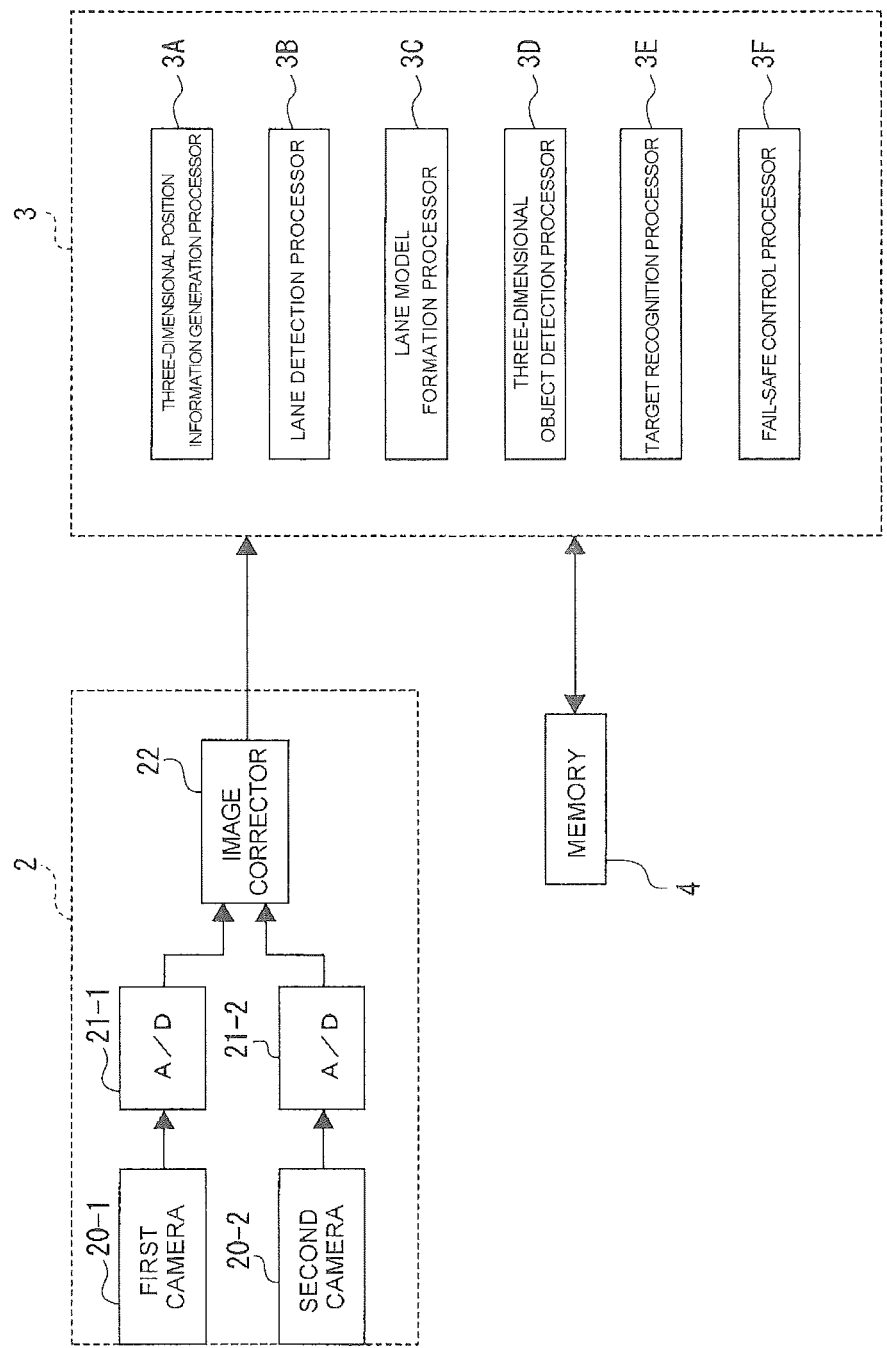

VEHICLE CONTROL SYSTEM

CROSS-REFERENCE TO RELATED APPLICATIONS

The present application claims priority from Japanese Patent Application No. 2013-227357 filed on Oct. 31, 2013, the entire contents of which are hereby incorporated by reference.

BACKGROUND

1. Technical Field

The present invention relates to the technical field of vehicle control systems that have a function of recognizing a vehicle exterior environment on the basis of captured images that are obtained through stereo-imaging of an advance direction of a vehicle equipped with the vehicle control system.

2. Related Art

Vehicle systems are known in which a vehicle exterior environment is recognized on the basis of, for instance, captured images that are obtained through stereo-imaging of the advance direction of a vehicle equipped with the vehicle control system, and in which predefined vehicle control (hereafter notated as "driving support control") for driving support is performed on the basis of the recognition result. For instance, vehicle systems are known where so-called pre-crash brake control is performed on the basis of a result of recognition of a vehicle that is present in the advance direction of the vehicle, or recognition of other predefined obstacles. Pre-crash brake control involves performing predefined vehicle control of, for instance, recognizing a predefined target object (obstacle), such as a preceding vehicle present in the advance direction of the vehicle, and issuing a warning to the driver, and/or assisting braking, if there is a concern of collision against the target object.

Literature citations that pertain to the present invention include Japanese Unexamined Patent Application Publication No. 2001-41741.

In the recognition process of a target object, an object other than the target object may in some instances be misrecognized as the target object, due to various events that occur in the actual travel environment. A concern arises herein in that driving support control such as the above pre-crash brake control, for which there was essentially no need, may be executed mistakenly if such misrecognition occurs.

Examples of cases of target object misrecognition include misrecognition, as a target object, of a reflection on a windshield derived from an object that is placed on the top face of the dashboard. Such a reflection, on the windshield, of an object on the dashboard may in some instances be misrecognized, in a target object recognition process, as a target object that is present at a close range, depending for instance on relationships with the lighting conditions of the object on the dashboard, and the scenery across the windshield. A concern of sudden braking of the vehicle, through immediate intervention of pre-crash brake control, arises thus in a case of misrecognition of the target object at a close range.

SUMMARY OF THE INVENTION

In order to overcome the above drawbacks, it is therefore a target object of the present invention to provide a vehicle control system that allows determining the presence or absence of a reflection on a windshield.

A first aspect of the present invention provides a vehicle control system that includes an imaging unit that performs stereo-imaging by a pair of cameras that capture an advance direction of a vehicle equipped with the vehicle control system, and an image processor that performs image processing for recognizing a vehicle exterior environment, on the basis of a captured image obtained by the imaging unit. The image processor executes: a distance calculation process of detecting, by pattern matching, corresponding points between a pair of captured images obtained through the stereo-imaging, working out a coordinate shift between the corresponding points as a parallax, and calculating a distance up to each corresponding point, on the basis of the parallax; a representative distance calculation process of dividing a distance image, in which a distance of each corresponding point as calculated in the distance calculation process is represented on an image, into a plurality of strip regions that partition the distance image in a vertical direction, and working out, for each strip region, a distance for which a frequency is equal to or higher than a predefined value as a representative distance; and a determination process of counting the number of the representative distances within a monitoring region that is set at a horizontal center section of a bottom end of an image having the distance as a vertical axis and having an image left-right position of the captured image as a horizontal axis, and determining a magnitude relationship between the count value and a threshold value.

The image processor may perform the determination process when a travel speed of the vehicle is determined to be equal to or higher than a predetermined speed.

The image processor may execute an object detection process of detecting an object present in the advance direction of the vehicle, on the basis of the representative distance for each strip region; and determines whether or not the object is detected stably within the monitoring region, in the object detection process, and executes the determination process on the basis of the determination result.

The image processor may determine whether the vehicle is turning or not, and executes the determination process on the basis of the determination result.

The image processor may determine whether the number of isolated data items of the representative distance is large or not, and executes the determination process on the basis of the determination result.

The image processor may determine whether or not the vehicle is traveling a downhill slope, or whether or not an uphill slope is being imaged by the imaging unit, and executes the determination process on the basis of the determination result.

The image processor may execute an object detection process of detecting an object present in the advance direction of the vehicle, on the basis of the representative distance for each strip region; and includes a driving support controller that executes a predefined vehicle control process as a driving support control process, on the basis of the detection result of the object in the object detection process, and the image processor forcibly terminates the driving support control process on the basis of the result of the determination process.

BRIEF DESCRIPTION OF THE DRAWINGS

FIG. 2 is a diagram for explaining image processing that is executed in an implementation;

DETAILED DESCRIPTION

1. Overall Configuration of the System

Figure 1:
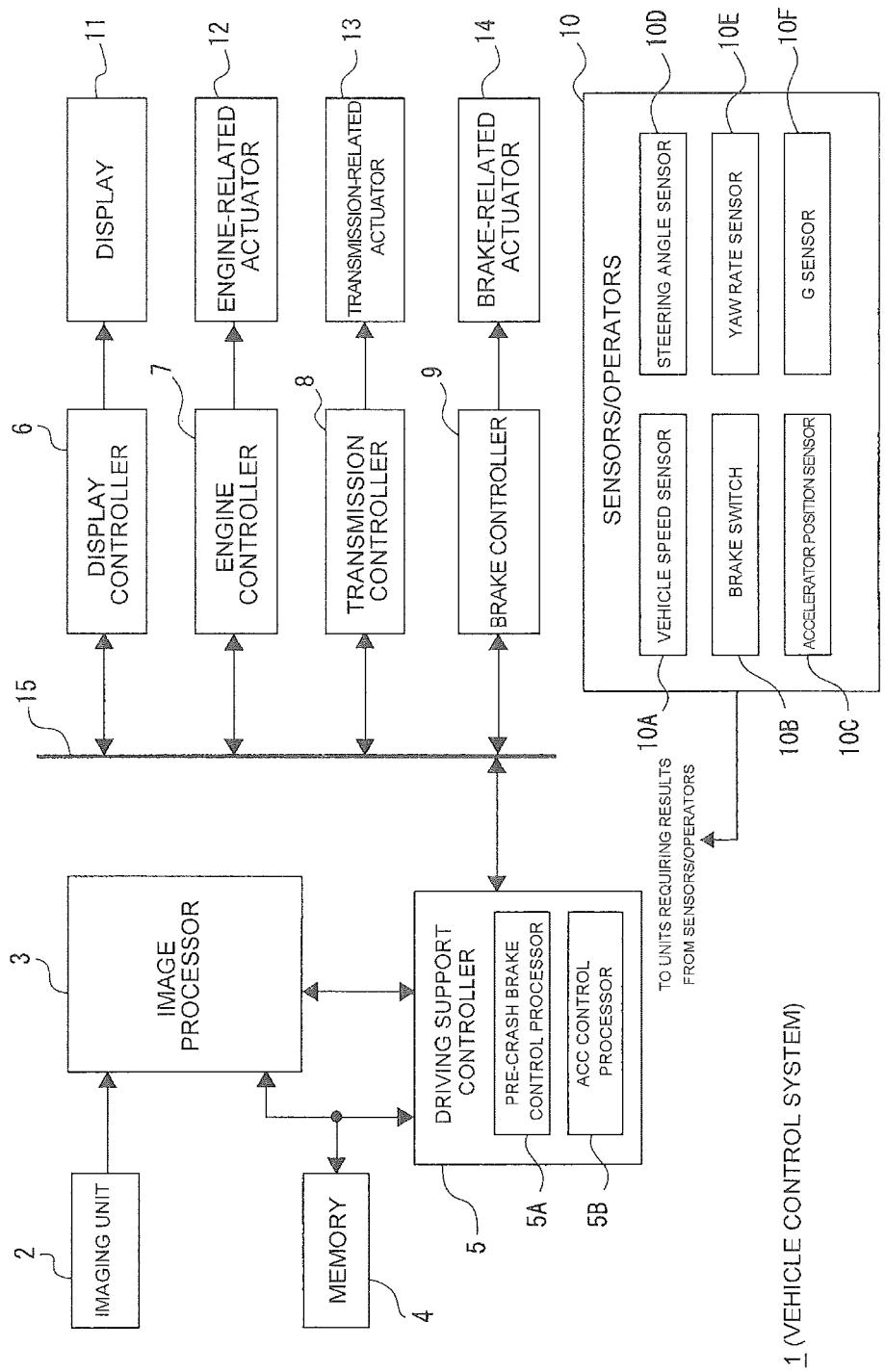
FIG. 1 is a diagram illustrating the configuration of a vehicle control system in an implementation.

FIG. 1 illustrates the configuration of a vehicle control system 1 according to an implementation of the present invention. In FIG. 1 there are extracted only the relevant parts of the configuration of the vehicle control system 1 that pertain mainly to the present invention.

The vehicle control system 1 is configured by comprising an imaging unit 2, an image processor 3, a memory 4, a driving support controller 5, a display controller 6, an engine controller 7, a transmission controller 8, a brake controller 9, sensors/operators 10, a display 11, an engine-related actuator 12, a transmission-related actuator 13, a brake-related actuator 14 and a bus 15, in a vehicle.

The image processor 3 executes predefined image processing pertaining to recognition of a vehicle exterior environment, on the basis of captured image data that is obtained through imaging, by the imaging unit 2, of the advance direction of the vehicle (frontward, in the present example). Image processing by the image processor 3 is performed using, for instance, the memory 4 configured in the form of a non-volatile memory or the like. The particulars of the internal configuration of the imaging unit 2 and the concrete process executed by the image processor 3 will be explained in detail further on.

The driving support controller 5 is made up of a microcomputer that is provided with, for instance, a central processing unit (CPU), a read only memory (ROM) and a random access memory (RAM). The driving support controller 5 executes various control processes (hereafter, notated as "driving support control process") for driving support, on the basis of, for instance, the results of image processing by the image processor 3, and detection information and operation input information obtained by the sensors/operators 10.

The driving support controller 5 is connected, by way of the bus 15, to the various controllers that are similarly made up of microcomputers, namely the display controller 6, the engine controller 7, the transmission controller 8 and the brake controller 9, such that these controllers can exchange data with one another. The driving support controller 5 issues instructions to the controllers necessary for driving support from among the above controllers, and causes the controllers to execute the operation pertaining to driving support.

As a driving support control process, the driving support controller 5 of the present example executes at least a process presented as a pre-crash brake control processor 5A and an adaptive cruise control (ACC: preceding vehicle-tracking auto-cruise) control processor 5B. A pre-crash brake control process executed by the pre-crash brake control processor 5A involves performing predefined vehicle control of, for instance, issuing a warning to the driver, and/or assisting braking, if it is determined that there is a concern of collision with a predefined target object, such as a preceding vehicle that is present in the advance direction of the vehicle, in a state where the target object has been detected by the image processor 3. Whether collision with the target object is a concern or not is determined on the basis of information on a distance Z up to the target object (three-dimensional object) as calculated by the image processor 3, as described further on.

An ACC control process executed by the ACC control processor 5B involves maintaining constant the vehicle-to-vehicle distance with a preceding vehicle, if any such is recognized, and performing acceleration and deceleration control of the vehicle in such a way so as to maintain a set constant speed, if no preceding vehicle is recognized within a given distance from the vehicle.

The sensors/operators 10 designate collectively various sensors/operators that are provided in the vehicle. Sensors among the sensors/operators 10 include a speed sensor 10A that detects the speed of the vehicle, a brake switch 10B that is switched on and off in response to the operation or non-operation of a brake pedal, an accelerator position sensor 10C that detects the accelerator position on the basis of the amount of depression of the accelerator pedal, a steering angle sensor 10D that detects a steering angle, a yaw rate sensor 10E that detects the yaw rate, and a G sensor 10F that detects acceleration. Although not depicted in the figures, other sensors include, for instance, an engine revolutions sensor, an intake air amount sensor that detects the amount of intake air, a throttle opening sensor that is interposed in the intake passage and that detects the degree of opening of a throttle valve that adjusts the amount of intake air supplied to the cylinders of the engine, a water temperature sensor that detects the temperature of cooling water, as an indicator of engine temperature, and an outside air temperature sensor that detects the temperature or air outside the vehicle. The sensors/operators 10 may have a wiper switch that indicates the ON/OFF state of a wiper.

Examples of the operators include, for instance, an ignition switch for instructing start or stop of the engine, a select lever for instructing selection of automatic transmission mode/manual transmission mode in an automatic transmission (AT) vehicle, and instructing upshift/downshift during a manual transmission mode, or a display switching switch for switching display information in an multi-function display (MFD) that is provided in the below-described display 11.

The display 11 encompasses collectively various MFDs and meters such as a speedometer, a tachometer and the like, provided in a meter panel that is disposed in front of the driver, as well as other display devices for presenting information to the driver. Herein, MFDs can display various information items such as total travel distance of the vehicle, outside air temperature, instantaneous fuel consumption and so forth, simultaneously or by switching between items.

The display controller 6 controls the display operation by the display 11 on the basis of, for instance, detection signals from predefined sensors and operation input information by the operators, among the sensors/operators 10. For instance, a predefined reminder message can be displayed at the display 11 (for instance, at a predefined region of an MFD), as a part of driving support, on the basis of an instruction from the driving support controller 5.

The engine controller 7 controls various actuators that are provided as the engine-related actuator 12, on the basis of, for instance, detection signals from predefined sensors and operation input information from operators among the sensors/operators 10. Various actuators pertaining to engine driving, for instance a throttle actuator that drives a throttle valve, and an injector for fuel injection, are provided herein as the engine-related actuator 12.

For instance, the engine controller 7 performs start/stop control of the engine in response to the operation of the above-described ignition switch. The engine controller 7 controls, for instance, a fuel injection timing, fuel injection pulse width, throttle opening and the like, on the basis of detection signals from predefined sensors, for instance an engine revolutions sensor and the accelerator position sensor 10C.

The transmission controller 8 controls various actuators that are provided as the transmission-related actuator 13, on the basis of, for instance, detection signals from predefined sensors and operation input information from operators among the sensors/operators 10. Various actuators relating to transmission, for instance a control valve that performs shift control of an automatic transmission, and a lock-up actuator that operates a lock-up clutch, are provided as the transmission-related actuator 13.

For instance, the transmission controller 8 performs shift control by outputting, to a control valve, a shift signal in accordance with a predefined shift pattern, when an automatic transmission mode is selected by the above-described select lever.

When a manual transmission mode is set, the transmission controller 8 performs shift control by outputting, to the control valve, a shift signal according to an upshift/downshift instruction by the select lever.

The brake controller 9 controls various actuators that are provided as the brake-related actuator 14, on the basis of, for instance, detection signals from predefined sensors and operation input information from operators among the sensors/operators 10. Various actuators relating to braking, for instance a hydraulic control actuator for controlling the output fluid pressure from a brake booster to a master cylinder, and for controlling fluid pressure within brake fluid piping, are provided as the brake-related actuator 14.

For instance, the brake controller 9 brakes the vehicle by controlling the hydraulic control actuator when the driving support controller 5 issues a brake-on instruction. Further, the brake controller 9 realizes so-called antilock brake system (ABS) control by calculating a slip ratio of the wheels on the basis of detection information by a predefined sensor (for instance, an axle rotational speed sensor, or the vehicle speed sensor 10A), and by increasing and reducing fluid pressure, by way of the above hydraulic control actuator, in accordance with the calculated slip ratio.

2. Image Processing Executed in the Present Implementation

The image processing executed in the present implementation will be explained as follows with reference to FIG. 2.

To explain image processing in FIG. 2, the internal configuration of the imaging unit 2 and of the memory 4 depicted in FIG. 1 will be illustrated together with the configuration of the image processor 3. The imaging unit 2 for obtaining the captured image data that is used in image processing will be explained in brief first.

The imaging unit 2 is provided with a first camera 20-1, a second camera 20-2, an A/D converter 21-1, an A/D converter 21-2 and an image corrector 22.

The first camera 20-1 and the second camera 20-2 are configured by comprising a camera optical system and an imaging element such as a charge coupled device (CCD) or a complementary metal oxide semiconductor (CMOS). Object images are formed, by the camera optical system, on the imaging plane of the imaging element, and electric signals corresponding to the intensity of received light at the imaging element is obtained in pixel units.

The first camera 20-1 and the second camera 20-2 are disposed so as to enable ranging by so-called stereo-imaging. That is, the cameras are disposed in such a manner that there is obtained a plurality of captured images of different perspective. The first camera 20-1 and the second camera 20-2 in the present example are disposed in the vicinity of the top of the windshield of the vehicle, and are spaced apart from each other by a predefined spacing in the vehicle width direction. The optical axes of the first camera 20-1 and the second camera 20-2 are parallel, and the focal lengths are set to substantially the same values. The frame periods are synchronous, and the frame rates as well match each other.

An electric signal obtained in the imaging element of the first camera 20-1 is supplied to, and undergoes A/D conversion in, the A/D converter 21-1, and an electric signal obtained in the imaging element of the second camera 20-2 is supplied to, and undergoes A/D conversion in, the A/D converter 21-2. As a result there are obtained digital image signals (image data) that denote luminance values, according to a predefined gradation, in the pixel units.

The image corrector 22 receives the input of image data (hereafter, notated as "first captured image data") based on images captured by the first camera 20-1 and obtained via the A/D converter 21-1, and of image data (hereafter, notated as "second captured image data") based on images captured by the second camera 20-2 and obtained via the A/D converter 21-2. The image corrector 22 corrects, in the first captured image data and the second captured image data, offset caused by mounting positional error in the first camera 20-1 and the second camera 20-2, for instance by affine conversion. The luminance values, including noise removal and so forth, of the first captured image data and the second captured image data are corrected also by the image corrector 22.

The first captured image data and the second captured image data obtained in the imaging unit 2 are recorded, by the image processor 3, in the memory 4, and are held therein.

The image processor 3, which is made up of, for instance, a microcomputer, executes, in accordance with an invoked program, various image processing items based on the first captured image data and the second captured image data.

FIG. 2 illustrates the various image processing items executed by the image processor 3, in the form of respective separate blocks for each function. Divided broadly into functions, as illustrated in the figure, the image processor 3 has a three-dimensional position information generation processor 3A, a lane detection processor 3B, a lane model formation processor 3C, a three-dimensional object detection processor 3D, a target recognition processor 3E and a fail-safe control processor 3F.

In a three-dimensional position information generation process executed by the three-dimensional position information generation processor 3A there is generated three-dimensional position information on the basis of the first captured image data and the second captured image data that are held in the memory 4. Specifically, the three-dimensional position information generation process involves detecting, by pattern matching, corresponding points between the first captured image data and the second captured image data (i.e. pair of stereo-imaged image data items), calculating a coordinate shift between detected corresponding points as a parallax dp, and generating, as three-dimensional position information, information on the position of the corresponding points in real space in accordance with the principles of triangulation using the parallax dp. To calculate the coordinate shift as the parallax dp, one from among the first captured image data and the second captured image data is established beforehand as a "reference image", and the other as a "comparison image". In order to enable calculation of the parallax dp for an object positioned at the horizontal-direction end on the reference image, the comparison image is generated in the form of an image having a greater number of pixels in the horizontal direction than that of the reference image.

Herein, the three-dimensional position information is expressed by a point (X, Y, Z) in space taking the point immediately below the middle between the pair of cameras (first camera 20-1 and second camera 20-2) as the origin, the X-axis as the direction in which the pair of cameras are joined, the Y-axis as the top-down direction, and the Z-axis as the front-rear direction. The values of X, Y, Z as the three-dimensional position information are represented by (i, j) as pixel coordinates, where the i-axis is an axis parallel to the horizontal direction in the reference image and the j-axis is an axis parallel to a perpendicular direction, and are worked out on the basis of coordinate conversion given by Expressions (1) to (3) below, where CD denotes the spacing of the pair of cameras, PW denotes the viewing angle per pixel, CH denotes the mounting height of the pair of cameras, and IV and JV respectively denote the i-coordinate and the j-coordinate, on the reference image, of a point at infinity ahead of the camera.

$$X = CD/2 + Z \times PW \times (i - IV) \quad \text{[Expression 1]}$$

$$Y = CH + Z \times PW \times (j - JV) \quad \text{[Expression 2]}$$

$$Z = CD/\{PW \times (dp - DP)\} \quad \text{[Expression 3]}$$

The term "DP" in Expression (3), which is referred to as vanishing point parallax or infinity-corresponding point, is in essence a point established so that the parallax dp between corresponding points, between the reference image and the comparison image, and a distance Z up to the corresponding point in real space, satisfy Expression (3) above.

A lane detection process executed by the lane detection processor 3B involves detecting a lane that is formed on the road surface and along which the vehicle is traveling, on the basis of the reference image (i.e. the image data set beforehand, from among the first captured image data and the second captured image data) and three-dimensional position information generated in the three-dimensional position information generation process (including the distance Z of each pixel as the corresponding point). In the lane detection process, specifically, firstly a lane candidate point on the reference image is detected on the basis of a luminance value of each pixel of the reference image and a distance Z of each pixel in real space, and left-right lane position of the vehicle is detected on the basis of the detected lane candidate points. For instance, a one-pixel-wide horizontal line on the reference image is searched while the horizontal line is shifted, pixel by pixel, in the left-right direction, and there is detected a pixel, as a lane candidate point, that satisfies a condition to the effect that a luminance differential value (=edge strength) of each pixel changes by a threshold value or by more, on the basis of the luminance value of each pixel in the reference image. This process is sequentially performed while shifting the horizontal line, as the search target, for instance one pixel width at a time, for example from the bottom end of the reference image upwards. Lane candidate points for the right region and the left region of the vehicle are detected as a result.

A lane model forming process executed by the lane model formation processor 3C involves forming a lane model in a three-dimensional space defined by the X, Y, Z axes, on the basis of information on the left-right candidate points as detected in lane detection above. Specifically, a lane model in three-dimensional space is formed through linear approximation, for instance by least squares, of the three-dimensional position (X, Y, Z) of the respective lane candidate point as detected by a lane detector.

Height information on the road surface on which the vehicle travels is also obtained from the lane model thus formed.

Figure 3A:
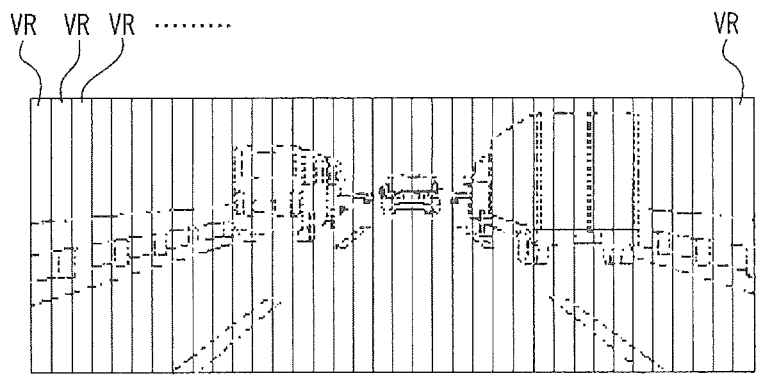
FIGS. 3A-3C are a set of explanatory diagrams of a three-dimensional object detection process in an implementation.
Figure 3B:
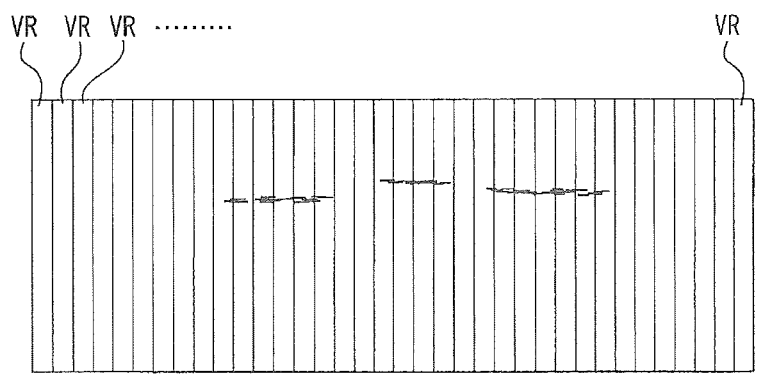
Figure 3C:
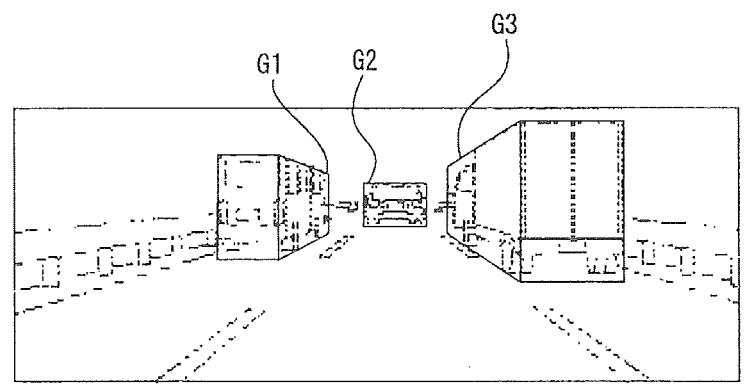

A three-dimensional object detection process executed by the three-dimensional object detection processor 3D involves detecting three-dimensional bodies that are present in the advance direction of the vehicle on the basis of three-dimensional position information. In the three-dimensional object detection process there is generated, for instance, a distance image in which corresponding points, detected in the preceding calculation process of parallax dp, are represented, on the image, mapped to respective values of distance Z. As illustrated in FIG. 3A, the distance image is split into a plurality of vertical regions VR that partition the distance image in the vertical direction. A distance histogram is created that denotes the distance distribution in the image vertical direction (j-direction), for each vertical region VR, such that the distance Z of a position (corresponding point) the frequency whereof is equal to or higher than a predefined value constitutes a representative distance of an object present within the respective vertical region VR (see FIG. 3B). For corresponding points in which a representative distance is obtained, pixel ranges deemed to be of one same object are grouped, on the basis of a relationship such as, for instance, the direction and/or distance Z up to contiguous corresponding points, to specify a range G of each three-dimensional object present in the image (FIG. 3C). As a result there are detected the three-dimensional bodies (notated as G1 to G3 in FIG. 3C) present within the image, including information on the distance Z up to the three-dimensional bodies as well as information on the size of the latter.

The techniques involved in the three-dimensional object detection process are identical to those described in Japanese Unexamined Patent Application Publication No. 2009-8539, where the relevant details can be found.

A target recognition process executed by the target recognition processor 3E involves recognizing a target object present in the advance direction of the vehicle on the basis of the reference image and three-dimensional object detection information derived from the three-dimensional object detection process. As used herein, the term target object denotes a preceding vehicle, a pedestrian or some other predefined obstacle that must be recognized (identified), upon execution of the driving support control process, from among the detected three-dimensional bodies.

To recognize a preceding vehicle, for instance, information on the distance Z to a detected three-dimensional object is monitored across a plurality of frames, to extract as a result, as a preceding vehicle, a three-dimensional object that is present on the travel road of the vehicle and that moves with a speed that satisfies a predetermined speed condition in an advance direction that is substantially identical to that of the vehicle. This is performed in conjunction with pattern matching relying on the reference image (for instance, pattern matching based on features of vehicles, such as brake lamps), in order to suppress misrecognition of three-dimensional bodies other than vehicles.

Upon recognition of a preceding vehicle, preceding vehicle recognition information is calculated in the form of preceding vehicle distance (=vehicle-to-vehicle distance with respect to the vehicle), preceding vehicle speed (=rate of change of vehicle-to-vehicle distance+vehicle speed) and preceding vehicle acceleration (=differential value of the preceding vehicle speed).

The techniques involved in the target recognition process are identical to those described in Japanese Unexamined Patent Application Publication No. 2012-66759, where the relevant details can be found.

A fail-safe control process executed by the fail-safe control processor 3F involves forcibly terminating the driving support control process that is executed by the driving support controller 5, and cancelling the forced termination of the process. In the fail-safe control process there is determined whether the degree of reliability of the image captured by the imaging unit 2 is low or not, such that if the degree of reliability is determined to be low, the driving support control process is forcibly terminated, with fail-safe in mind, whereas if the degree of reliability is determined to be not low, the forced termination of the process is cancelled.

Examples of determination conditions for determining the degree of reliability of the captured image include, for instance, the conditions disclosed in Reference literature 1 and Reference literature 2 below, but the determination conditions are not particularly limited to specific conditions, so long as the conditions are set so as to allow properly determining situations where the degree of reliability of the captured image can be regarded as low, for instance rainy weather, dirt adhered to the windshield, backlighting or the like.

Reference 1: Japanese Unexamined Patent Application Publication No. 2001-28056

Reference 2: Japanese Unexamined Patent Application Publication No. 2001-43496

In a case where the driving support control process is forcibly terminated in the fail-safe control process, a process is also jointly performed for notifying to the driver that the process has been forcibly terminated, for instance through display of notification information to that effect on the display 11.

Herein, the fail-safe control process of the present implementation involves performing, as one determination process regarding the degree of reliability of the captured image, a process of determining the presence or absence of a reflection on a windshield.

Figure 4A:
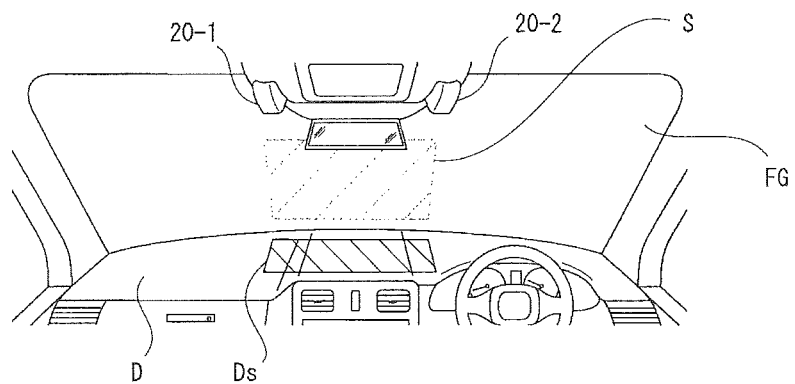
FIGS. 4A-4B are a set of explanatory diagrams of a reflection on a windshield.
Figure 4B:
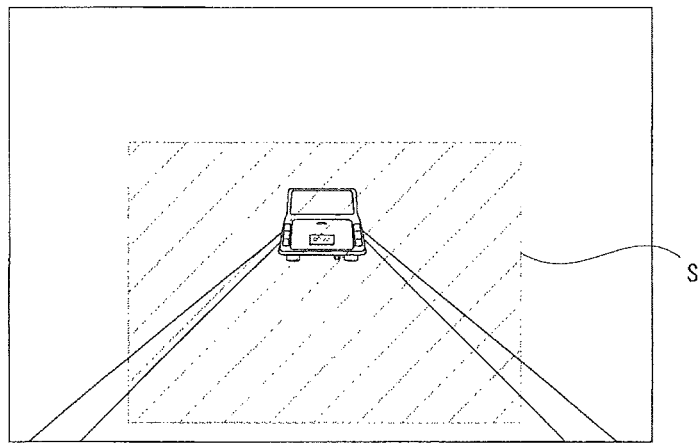

FIGS. 4A-4B are a set of explanatory diagrams of a reflection on a windshield.

In the present description, reflection on the windshield denotes a phenomenon where an object Ds, which is placed on the top face of a dashboard D of the vehicle, is reflected and projected onto a windshield FG, as illustrated in FIG. 4A. Thereafter, such a reflection onto the windshield FG, caused by the object Ds on the dashboard D, will be notated as "reflection S".

Such a reflection S is projected onto the captured image by the imaging unit 2, as illustrated in FIG. 4B. This occurrence can be misdetected as a three-dimensional object in the above-described three-dimensional object detection process. A concern arises thus in that the reflection S thus misdetected may be misrecognized in the above-described target recognition process, as a close-range target object present in front of the vehicle, which may give rise, as a result, to dangerous sudden braking of the vehicle through immediate intervention of brake control by the above-described pre-crash brake control process. Alternatively, the ACC control process may attempt to secure a fixed vehicle-to-vehicle distance with respect to such a close-range target object, which may give rise to the concern of unnecessary braking of the vehicle.

In the present implementation, therefore, the presence or absence of the reflection S is determined as part of the fail-safe control process, and the process of forcibly terminating a driving support control process such as the pre-crash brake control process or the ACC control process is executed on the basis of the result of that determination.

The presence or absence of the reflection S is determined on the basis of a representative distance that is worked out for each vertical region VR in the above-described object detection process. Specifically, the process involves herein setting a monitoring region AW for the image, with the distance Z as the vertical axis and an i-direction position (i.e. left-right position of the captured image) as the horizontal axis, counting the number of representative distances present within the monitoring region AW, and determining the magnitude relationship between the count value and a threshold value.

Figure 5A:
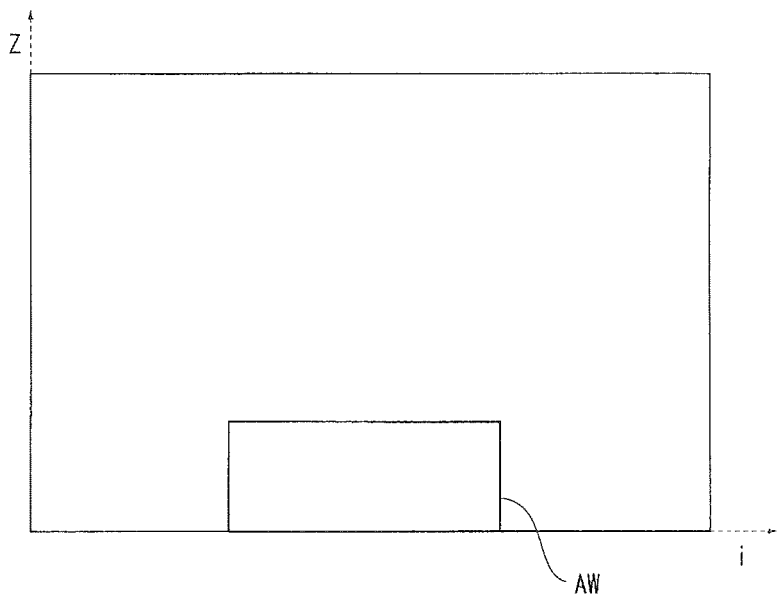
FIGS. 5A-5B are a set of explanatory diagrams of a monitoring region.
Figure 5B:
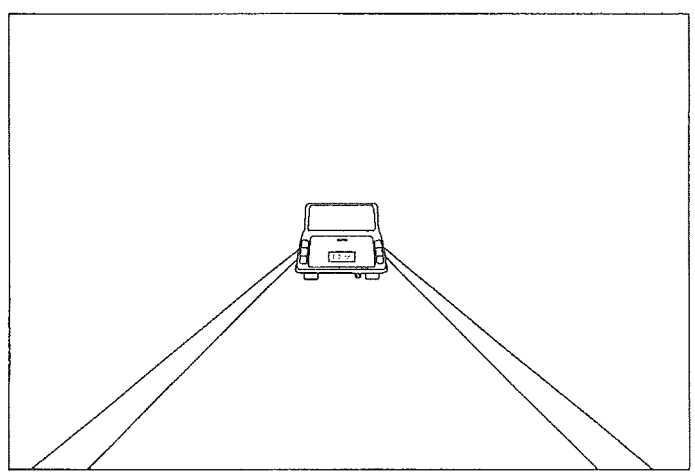

FIGS. 5A-5B are a set of explanatory diagrams of the monitoring region AW. As illustrated in FIG. 5A, the monitoring region AW is set at a horizontal center section of the bottom end of an image having the distance Z as the vertical axis and the i-direction position as the horizontal axis. Such a monitoring region AW allows, for instance, catching the road surface alone that is positioned at a close range of the vehicle, in a situation where the vehicle is traveling on the road, as illustrated in for instance FIG. 5B.

In the present example, the position in the i-direction and the width of the monitoring region AW are set in such a manner that a roadside object (for instance, a guard rail or wall) does not lie within the monitoring region AW, in narrow roads (for instance, 2.5 m-wide) that are envisageable in an actual travel environment. The length (i.e. the range of distance Z) in the height direction of the monitoring region AW and the position in the height direction are set in such a manner that a preceding vehicle does not lie within the monitoring region AW in a state where the vehicle has some speed (for instance, at 20 km/h or faster), except when the vehicle is stopped or is crawling along.

The monitoring region AW of the present example, specifically, is set to exhibit a range of i-direction=71-st block to 117-th block and a range of Z direction=0 m to 12 m, for a case where the horizontal size of the distance image, with one block set to 4×4=16 pixels, is 188 blocks, and the width of each vertical region VR is 4 pixels. That is, the origin of the i-coordinate is the left-most position of the image.

Figure 6:
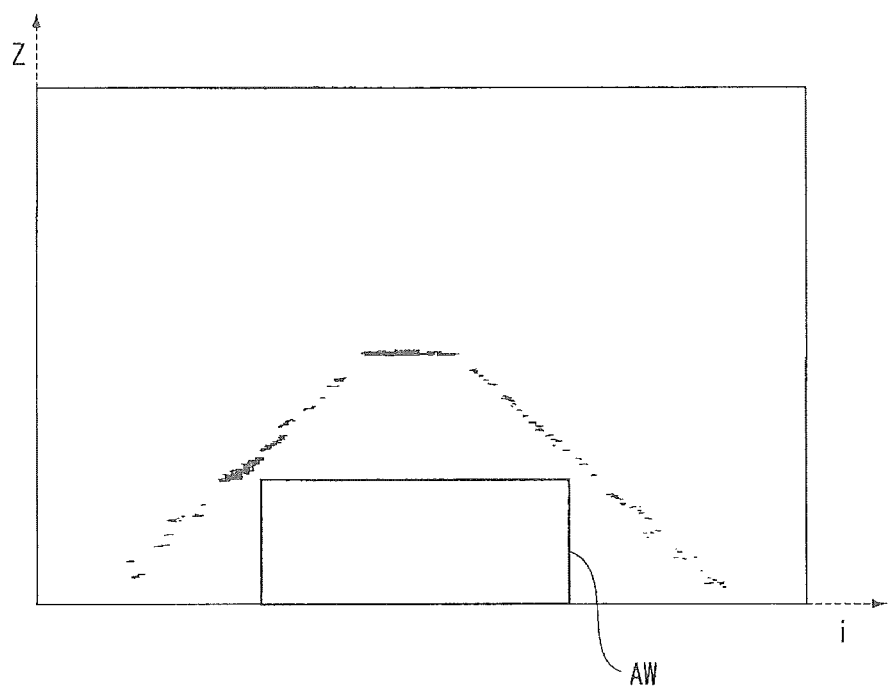
FIG. 6 is an explanatory diagram of a relationship between a captured image, a monitoring region, and representative distances in a case where a vehicle equipped with the vehicle control system is traveling on a road and no reflection occurs.

Herein, there is a high likelihood that no representative distance appears within the monitoring region AW, as illustrated in FIG. 6, in a case where the vehicle is traveling along the road and no reflection S occurs, as illustrated in FIG. 5B. This arises from the fact that there is a high likelihood that only the road surface is captured as an object present in the vicinity of the close-range horizontal center of the vehicle, in a case where no reflection S occurs. When working out the representative distance for each vertical region VR in this case, a representative distance appears outside the monitoring region AW, while virtually no representative distance appears, within the monitoring region AW, for a preceding vehicle or an object that is present on the roadside (for instance, a roadside wall), as illustrated in FIG. 6.

Figure 7A:
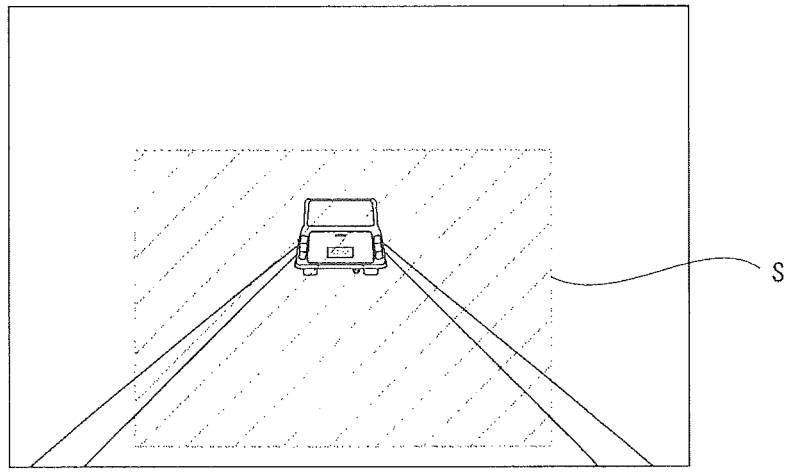
FIGS. 7A-7B are a set of explanatory diagrams of a relationship between a captured image, a monitoring region, and representative distances in a case where the vehicle is traveling on a road and a reflection occurs.
Figure 7B:
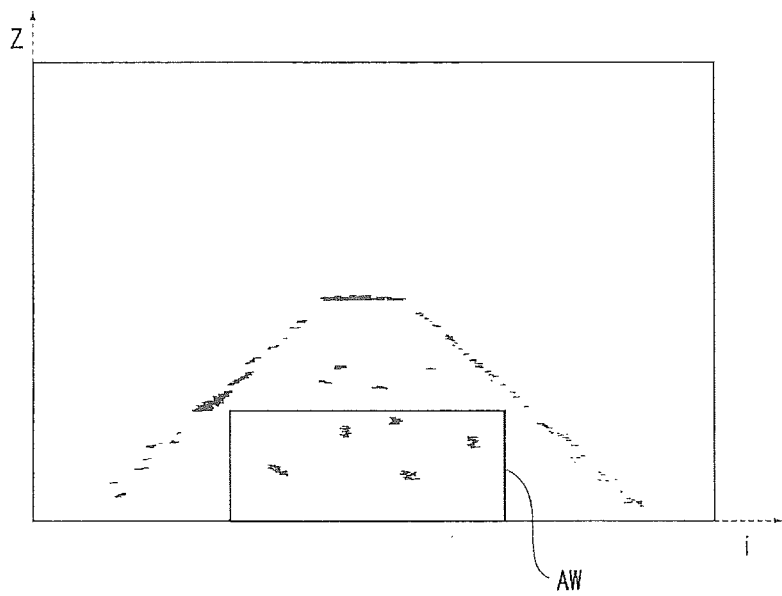

On the other hand, in a case where a reflection S occurs, as illustrated in FIG. 7A, a representative distance derived from the reflection S appears within the monitoring region AW, as illustrated in FIG. 7B, as can be appreciated from the fact that the reflection S can be misdetected as a close-range object, as described above.

Accordingly, the presence or absence of a reflection S can be determined by counting the number of representative distances that are present within the monitoring region AW, as described above, and determining a magnitude relationship of the count value and the threshold value.

In an actual travel environment, an object other than a reflection S and such that the distance to that object can be calculated may be conceivably imaged within the monitoring region AW depending on, for instance, the type of the travel road, the travel state of the vehicle, natural phenomena and the like. In the present example, accordingly, the precision of the determination of the presence or absence of a reflection S is enhanced by executing a determination process based on count values of representative distances, excluding a case where there is a high likelihood that a representative distance due to an object other than a reflection S is mixed in the monitoring region AW, as described below.

3. Fail-Safe Control Process as an Implementation

Figure 8:
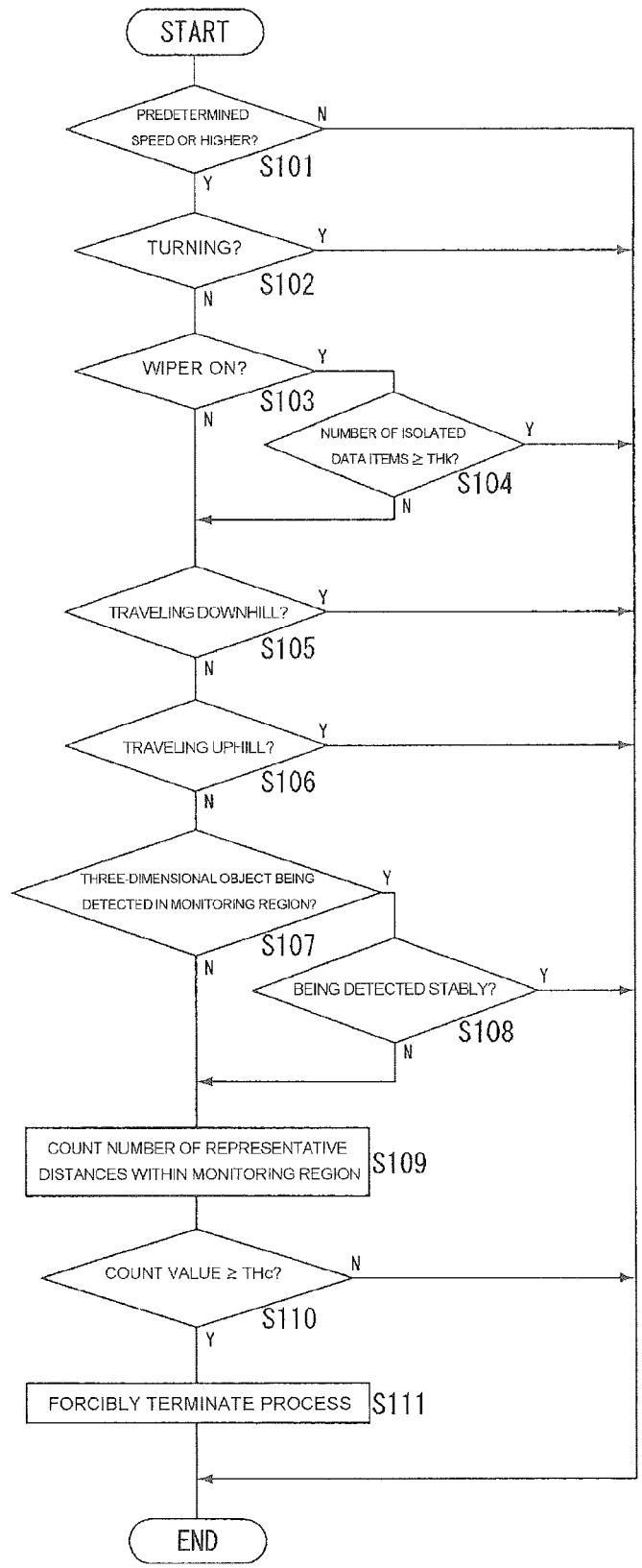
FIG. 8 is a flowchart illustrating a concrete technique of a fail-safe control process as an implementation.

FIG. 8 is a flowchart illustrating a concrete technique of the fail-safe control process as an implementation. FIG. 8 illustrates only an extracted process pertaining to determination of the presence or absence of a reflection S, from among the processes that are executed by the image processor 3 as the fail-safe control processor 3F, and other processes are not illustrated.

The process illustrated in FIG. 8 is repeatedly at every one-frame period of the images captured by the imaging unit 2.

Firstly, the image processor 3 discriminates, in step S101, whether or not the travel speed of the vehicle is equal to or higher than a predetermined speed. Specifically, it is determined for instance whether or not the travel speed is equal to or higher than 20 km/h.

If a negative result is obtained in step S101, the image processor 3 terminates the process illustrated in FIG. 8. As is apparent from the above explanation, an object is readily detected at a close range while the vehicle is stopped or is crawling along, and a representative distance due to the object is readily mixed in the monitoring region AW. In such a case, accordingly, determination precision is enhanced by not executing determination of the presence or absence of a reflection S, so that, thereby, determination of the presence or absence of a reflection S is not performed, in a situation where there is a high likelihood that a representative distance due to an object other than a reflection S is mixed in the monitoring region AW. In other words, determination precision is enhanced by prescribing thus determination of the presence or absence of a reflection S to be performed in a situation where there is a low likelihood that a representative distance due to an object other than a reflection S is mixed in the monitoring region AW.

In a case where, by contrast, a positive result to the effect that the travel speed of the vehicle is equal to or higher than the predetermined speed, the image processor 3 proceeds to step S102, and discriminates whether the vehicle is turning or not. Whether or not the vehicle is turning is discriminated herein on the basis of a detection signal by the steering angle sensor 10D or the yaw rate sensor 10E.

If a positive result is obtained to the effect that the vehicle is turning, the image processor 3 terminates the process illustrated in FIG. 8.

Figure 9A:
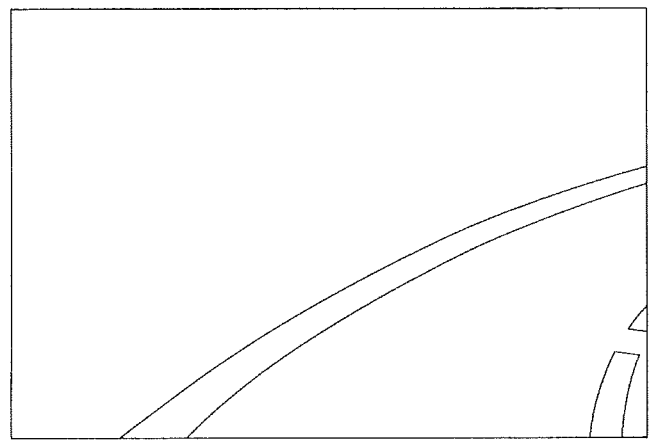
FIGS. 9A-9B are a set of explanatory diagrams of a relationship between a captured image, a monitoring region, and representative distances in a case where the vehicle is turning.
Figure 9B:
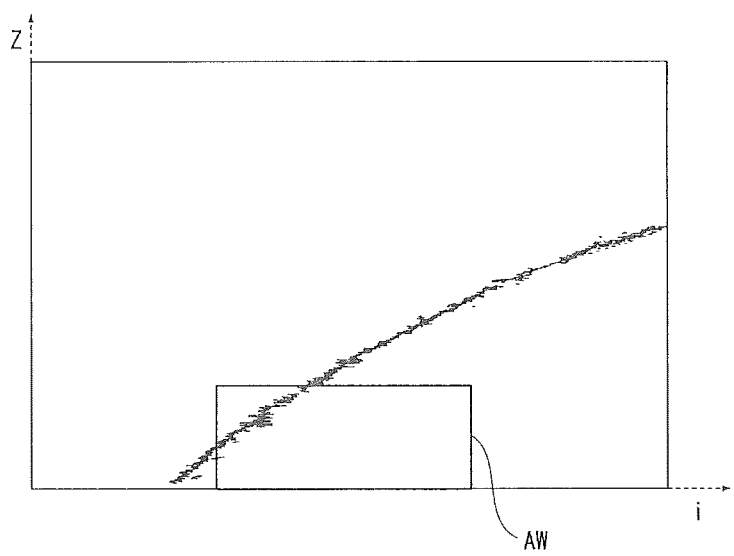

A representative distance due to a roadside object (for instance, a roadside wall in the example of the figure) readily appears within the monitoring region AW, as illustrated in FIG. 9B, on the basis of the captured image in a case, where the vehicle is turning, such as the one illustrated in FIG. 9A. If it is determined that the vehicle is turning, therefore, determination precision is enhanced by not executing determination of the presence or absence of a reflection S, so that, thereby, determination of the presence or absence of a reflection S is not performed, in a situation where there is a high likelihood that a representative distance due to an object other than a reflection S is mixed in the monitoring region AW.

In FIG. 8, if a negative result is obtained in step S102 to the effect that the vehicle is not turning, the image processor 3 proceeds to step S103, and discriminates whether or not the wiper is on. If a positive result is obtained to the effect that the wiper is on, the image processor 3 discriminates in step S104 whether or not the number of isolated data items is equal to or higher than a threshold value THk. Herein, the term isolated data refers to representative distances that are not aggregated on the image, from among the representative distances worked out for each vertical region VR. In the present example, isolated data denotes representative distances that are not grouped in the object detection process, from among the representative distances.

If in step S104 a positive result is obtained to the effect that the number of isolated data items is equal to or higher than the threshold value THk, the image processor 3 terminates the process illustrated in FIG. 8.

As explained above, the road surface is imaged primarily in the vicinity of the close-range horizontal center of the vehicle, However, in a situation where the road surface is wet, for instance during rainy weather, an object in the surroundings of the road surface is readily reflected, and there is a high likelihood that a representative distance due to reflection on such a road surface is obtained within the monitoring region AW.

A greater number of isolated data on representative distances appears on the image as a whole, in a situation where the road surface is wet. In a case where the number of isolated data items is determined to be equal to or higher than the threshold value THk, therefore, the determination precision is enhanced by not executing a determination of the presence or absence of a reflection S, so that there is not performed determination of the presence or absence of a reflection S in a situation where there is a high likelihood that the representative distance due to a reflection on the road surface is mixed within the monitoring region AW, i.e. a situation where there is high likelihood that a representative distance due to an object other than a reflection S is mixed in the monitoring region AW.

The determination in step S104 is performed in conjunction with the determination in step S103 of whether or not the wiper is ON, in order to enhance the precision with which rainy weather is distinguished from non-rainy weather.

If the image processor 3 obtains in step S103 of FIG. 8 a negative result to the effect that the wiper is not ON, or obtains in step S104 a negative result to the effect that the number of isolated data items is not equal to or higher than the threshold value THk, the process proceeds to step S105.

In step S105 the image processor 3 discriminates whether the vehicle is traveling a downhill slope or not. Discrimination of whether the vehicle is traveling a downhill slope can be performed, for instance, on the basis of the detection signal of the G sensor 10F. If a positive result is obtained to the effect that the vehicle is traveling a downhill slope, the image processor 3 terminates the process illustrated in FIG. 8.

Figure 10A:
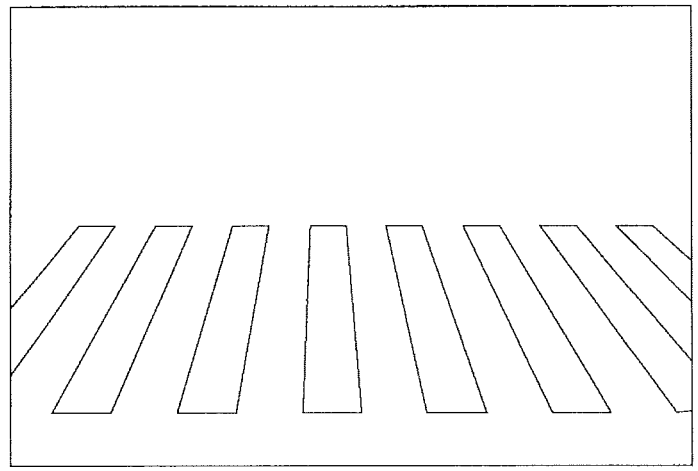
FIGS. 10A-10B are a set of explanatory diagrams of a relationship between a captured image, a monitoring region, and representative distances in a case where the vehicle is traveling a downhill slope.
Figure 10B:
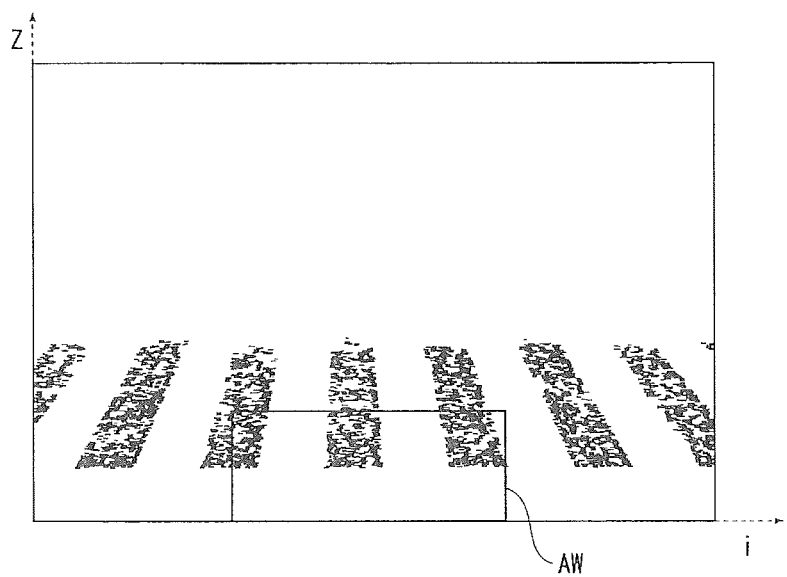

If the vehicle is traveling a downhill slope, an object on the road surface, such as painted patches of a crosswalk are readily imaged as an object present in the vicinity of the close-range horizontal center of the vehicle, for instance as illustrated in FIG. 10A; as a result, comparatively more representative distances due to an object on the road surface tend to appear within the monitoring region AW, as illustrated in FIG. 10B. In the vicinity of the downhill end point, in particular, the road surface at a close range is imaged tilted frontwards with respect to the imaging plane of the cameras; thereby a representative distance due to an object on the road surface appears readily within the monitoring region AW.

In a case where the vehicle is traveling a downhill slope, accordingly, determination precision is enhanced by not executing determination of the presence or absence of a reflection S, so that, thereby, determination of the presence or absence of a reflection S is not performed, in a situation where there is a high likelihood that a representative distance due to an object other than a reflection S is mixed in the monitoring region AW.

When the image processor 3 obtains in step S105 of FIG. 8 a negative result to the effect that the vehicle is not traveling a downhill slope, the process proceeds to step S106, and it is discriminated, in step S106, whether an uphill slope is being imaged or not. Discrimination of whether an uphill slope is being imaged or not can be performed for instance on the basis of a lane model that is formed in the above-described lane model forming process. Specifically, it is discriminated for instance whether or not an upslope lane is present within a predefined distance.

Figure 11A:
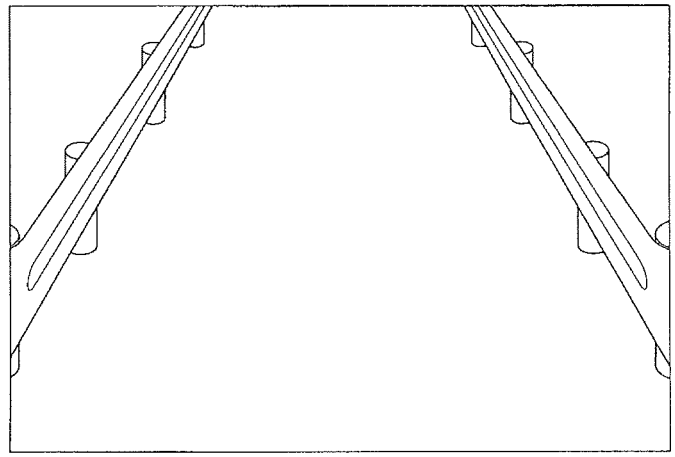
FIGS. 11A-11B are a set of explanatory diagrams of a relationship between a captured image, a monitoring region, and representative distances in a case where an uphill slope is being imaged.
Figure 11B:
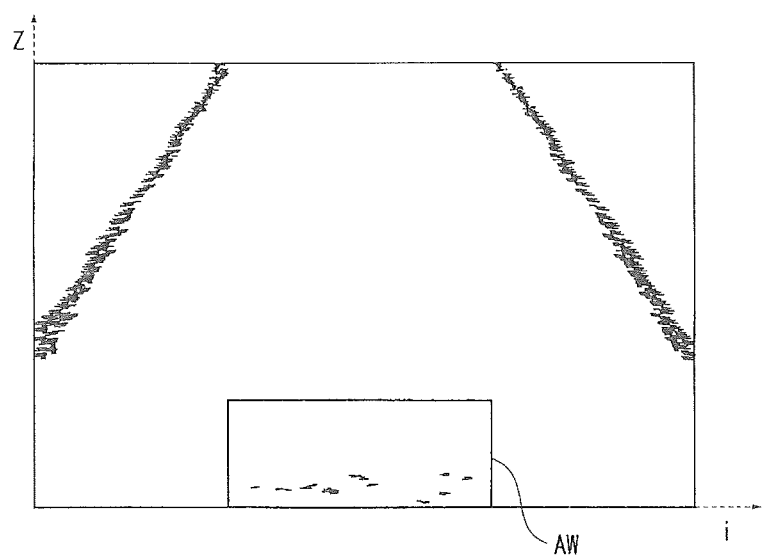

The road surface at a close range is imaged tilted frontwards with respect to the imaging plane of the cameras, in a situation where an uphill slope is being imaged, as illustrated in FIG. 11A. Accordingly, a representative distance due to an object on the road surface appears readily within the monitoring region AW, as in the case of travel downhill (see FIG. 11B).

In a case where the vehicle is traveling downhill, therefore, determination precision is enhanced by not executing determination of the presence or absence of a reflection S, so that, thereby, determination of the presence or absence of a reflection S is not performed, in a situation where there is a high likelihood that a representative distance due to an object other than a reflection S is mixed in the monitoring region AW.

If the image processor 3 obtains in step S106 a negative result to the effect that an uphill slope is not being imaged, the process proceeds to step S107, and it is discriminated whether or not a three-dimensional object is being detected within the monitoring region AW. Specifically, it is discriminated whether or not a three-dimensional object is present such that the distance Z and a left-right position of a detection range G overlap, respectively, with the distance Z range and left-right range that are set, as the monitoring region AW, in the three-dimensional object that is detected in the above-described three-dimensional object detection process.

If a negative result is obtained to the effect that no three-dimensional object is being detected within the monitoring region AW, the image processor 3 proceeds to step S109, counts the number of representative distances within the monitoring region AW, and discriminates, in step S110, whether or not the resulting count value is equal to or higher than a threshold value THc.

If no three-dimensional object is detected within the monitoring region AW, there is a comparatively low likelihood that a representative distance due to an object other than a reflection S is mixed in the monitoring region AW. In such cases, accordingly, there is determined the presence or absence of reflection based on the count value of the number of representative distances within the monitoring region AW, and on the threshold value THc as described above.

On the other hand, if in step S107 a positive result is obtained to the effect that the three-dimensional object is being detected within the monitoring region AW, the image processor 3 proceeds to step S108, and discriminates whether or not the three-dimensional object is being detected stably. Discrimination as to whether or not the three-dimensional object is being detected stably is performed using not only detection information of the three-dimensional object in a current frame image, but using also detection information on the three-dimensional object in a past frame image. In the present example, specifically, determination of whether or not the three-dimensional object is being detected stably is performed on the basis of the criteria of:—whether the number of consecutive detection frames of the three-dimensional object is equal to or higher than a predefined number;—whether the change in size of the three-dimensional object is small or not;—whether the number of OK-distance data items within the detection range G of the three-dimensional object is large or not.

Herein, the number of OK-distance data items denotes the number of distances Z, from among the distances Z calculated within the detection range G of the three-dimensional object, such that a difference with respect to a representative distance of the three-dimensional object is no greater than a predefined value (in the present example there is used the average value of the representative distances of the vertical regions VR within the detection range G of the three-dimensional object). In the present example, for instance, the number of distances Z such that the difference with respect to the representative distance of the three-dimensional object is no greater than ±5 m is taken as the number of OK-distance data items.

Discrimination as to whether or not the number of consecutive detection frames of the three-dimensional object is equal to or higher than a predefined number is performed, for instance, by discriminating whether or not the number of continuous detection frames is equal to or higher than a threshold value that is calculated by converting three seconds to the number of frames.

Discrimination on whether the change in size of the three-dimensional object is small or not is performed, for instance, by calculating an amount of change (%) in vertical size and horizontal size of the detection range G of the three-dimensional object, between a current frame and a directly preceding frame; discriminating, for each frame, whether either one of the amounts of change in vertical size and horizontal size lies or not in the range from 50% to 150%, and obtaining a discrimination result to the effect that the change in size of the three-dimensional object is small when a state where the change in size lies in the range from 50% to 150% persists for instance for three consecutive frames, and, otherwise, a discrimination result to the effect that the change in size is not small. Discrimination on whether the change in size is small or not may be accomplished using the surface area of the detection range G as a criterion, and may be performed as a complete discrimination process for each frame. In any case, the discrimination technique on whether or not the change in size is small is not necessarily limited to the above technique, and many other conceivable techniques may be resorted to instead.

Further, the discrimination on whether the number of OK-distance data items is large or not is performed, for instance, on the basis of a proportion (%) of OK-distance data in the detection range G of the three-dimensional object. Specifically, a positive result of large number of OK-distance data items is obtained if "number of OK-distance data items/number of blocks in the detection range G" is for instance equal to or higher than 60%, and a negative result is obtained otherwise. By using a proportion as a criterion, as described above, it becomes possible to estimate accurately the abundance of OK-distance data regardless of the size of the three-dimensional object.

Conceivable techniques for discriminating whether or not the number of OK-distance data items is large are numerous and not limited to the above technique, and may involve, for instance, discriminating whether or not the number of OK-distance data items is equal to or higher than a predefined value. Herein, discriminating whether or not the number of OK-distance data items is large is equivalent to discriminating whether or not the variability of the distance Z calculated within the detection range G of the three-dimensional object is small.

In step S108, a positive result to the effect that the three-dimensional object is being detected stably is obtained if all three types of discrimination process above yield a positive result; otherwise, a negative result is obtained to the effect that the three-dimensional object is not being detected stably.

If a positive result is obtained to the effect that the three-dimensional object is being detected stably, the image processor 3 terminates the process illustrated in FIG. 8 without determining the presence or absence of a reflection S. On the other hand, if a negative result is obtained to the effect that the three-dimensional object is not being detected stably, i.e. if there is obtained a determination result to the effect that the three-dimensional object is being detected unstably, the image processor 3 proceeds to step S109, counts the number of representative distances within the monitoring region AW, and discriminates in step S110 whether or not the count value is equal to or higher than the threshold value THc.

If there is a plurality of detected three-dimensional bodies within the monitoring region AW, the discrimination of step S108 as to whether or not the three-dimensional object is being detected stably is performed for each three-dimensional object, such that if there is even one three-dimensional object being detected stably, the process illustrated in FIG. 8 is terminated, the determination on the presence or absence of reflection is not carried out, and the process proceeds to step S110 and the determination therein is executed, only if all the three-dimensional bodies are not being detected stably (i.e. if the three-dimensional bodies are being detected unstably).

Figure 12A:
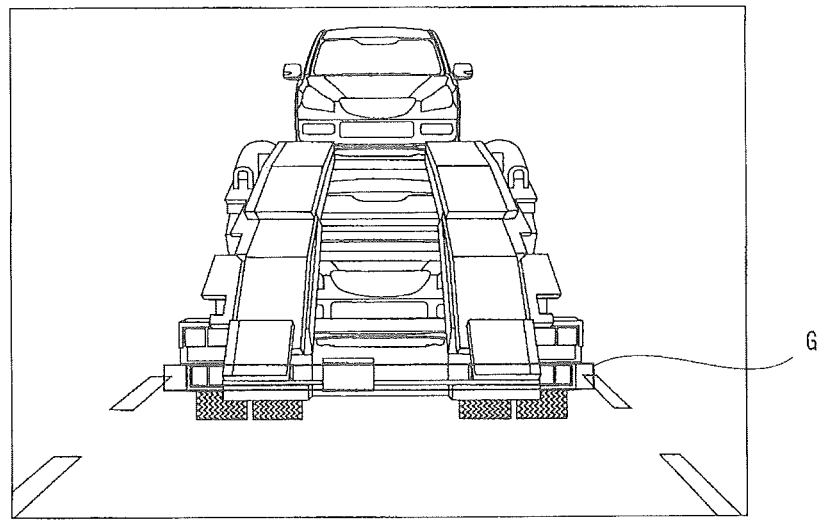
FIGS. 12A-12B are a set of explanatory diagrams of a relationship between a captured image, a monitoring region, and representative distances in a case where an object is being detected stably within a monitoring region.
Figure 12B:
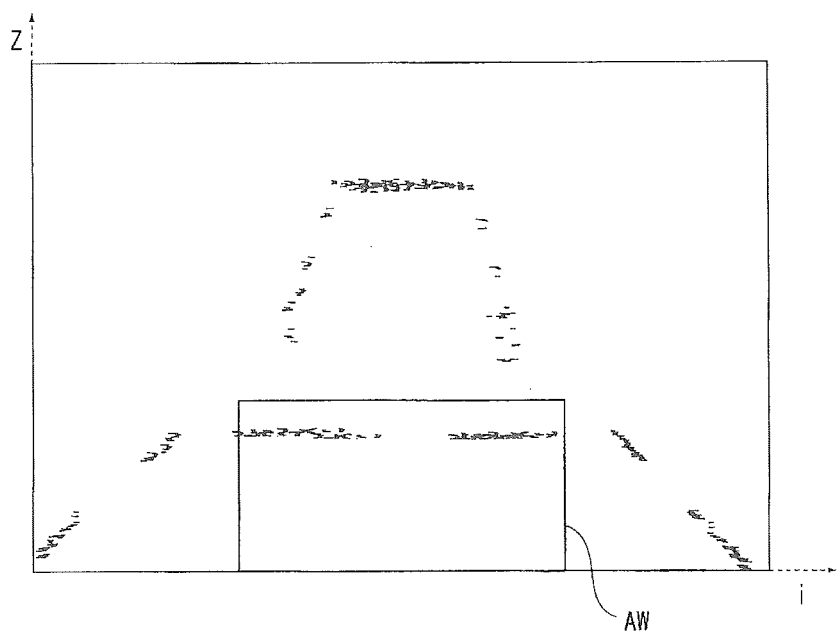

FIGS. 12A-12B are diagrams for explaining an example of an instance where a three-dimensional object within the monitoring region AW is being detected stably. In this case, specifically, the rear end of a car hauler, as a preceding vehicle that is present at a comparatively close range, for instance as illustrated in FIG. 12A, is detected as the three-dimensional object (see detection range G in the figure), and a representative distance due to the detected three-dimensional object appears in a comparatively large number within the monitoring region AW (see FIG. 12B). In a situation where the three-dimensional object is being detected stably within the monitoring region AW, the count value of number of representative distances increases according to representative distances due to the three-dimensional object. It is found that, in consequence, determination of the presence or absence of a reflection S cannot be performed appropriately.

In the present implementation, the process proceeds to step S109 and determination of the presence or absence of a reflection S is performed in a case where no three-dimensional object is being detected stably within the monitoring region AW, as described above (if a three-dimensional object is being detected unstably).

It is found that the way in which a reflection S manifests itself varies depending on, for instance, the lighting conditions on the object Ds on the dashboard, or the scenery across the windshield, and as a result, the reflection S tends to be detected unstably by the object detection process. Accordingly, the determination precision is enhanced by determining the presence or absence of a reflection S, corresponding to a case where the three-dimensional object is being detected unstably within the monitoring region AW, to execute thereby a determination process corresponding to a case of high likelihood of occurrence of a reflection S.

The image processor 3 terminates the process illustrated in FIG. 8 if a negative result is obtained in step S110 of FIG. 8 to the effect that the count value is not equal to or higher than the threshold value THc. If a positive result to the effect that the count value is equal to or higher than the threshold value THc, the process proceeds to step S111, and the image processor 3 executes a process of forcibly terminating the driving support control process, to terminate the process illustrated in FIG. 8.

In the present example, the forcible termination process of step S111 involves executing a process of forcibly terminating at least the pre-crash brake control process and the ACC control process in the driving support control process that is executed by the driving support controller 5.

For instance, experiments may be performed that involve counting the number of representative distances that appear within the monitoring region AW through actual occurrence of a reflection S, for various bodies conceivable as the object Ds that is placed on the dashboard D, such that, values that are deemed, on the basis of the counting result, to allow for proper determination of the presence or absence of a reflection S in the series of processes above are derived and set as the threshold value THc that is used in step S110.

Examples have been illustrated of an instance where the driving support control process is forcibly terminated if, upon determination that there is a reflection S, a count value of the number of representative distances within the monitoring region AW exceeds, even once, the threshold value THc. However, the process can be modified to a process that involves calculating a point in such a manner that a value is added in accordance with a determination result on whether or not the count value of the number of representative distances exceeds the threshold value THc, and taking a determination result of a magnitude relationship of the point and a predetermined threshold value as the final determination result on the presence or absence of a reflection S.

Alternatively, the process may be configured to ultimately yield a determination result to the effect that there is a reflection S if the number of consecutive times that the threshold value THc is exceeded reaches a predefined number or times.

4. Overview of Implementations

As described above, the vehicle control system 1 of the present implementation comprises the imaging unit 2 that performs stereo-imaging by a pair of cameras that capture the advance direction of the vehicle, and the image processor 3 that performs image processing for recognizing the vehicle exterior environment, on the basis of the captured image obtained by the imaging unit 2.

The image processor 3 then executes: a distance calculation process (part of a three-dimensional position information generation process) of detecting, by pattern matching, corresponding points between a pair of captured images as obtained by stereo-imaging, working out a coordinate shift between the corresponding points as a parallax dp, and calculating respective distances Z up to the corresponding points, on the basis of the parallax dp; a representative distance calculation process (part of a three-dimensional object detection process) of dividing a distance image, resulting from representing, on an image, the distance Z of each corresponding point as calculated in the distance calculation process, into a plurality of strip regions (vertical regions VR) that partition the distance image in the vertical direction, and working out, for each strip region, a distance Z for which a frequency is equal to or higher than a predefined value, as a representative distance; and a determination process of counting the number of representative distances within the monitoring region AW that is set at a horizontal center section of the bottom end of an image having the distance Z as a vertical axis and an captured-image left-right position as a horizontal axis, and determining the magnitude relationship between the resulting count value and a threshold value THc.

The monitoring region AW is a region that targets an object that is present in the vicinity of the close-range horizontal center of the vehicle. The object that is present in the vicinity of the close-range horizontal center of the vehicle when the latter is traveling on a road is primarily the road surface. However, the number of calculated distances for the road surface is ordinarily small, and representative distances as well appear in small numbers. When a reflection S occurs, by contrast, the number of calculated distances within the monitoring region AW increases, and the number of corresponding representative distances as well tends to increase accordingly. The number of representative distances within the monitoring region AW is thus appropriate as an index for determining the presence or absence of a reflection S.

Therefore, the presence or absence of a reflection S can be determined by counting the number of representative distances within the monitoring region AW, and performing a determination based on the resulting count value and the threshold value THc.

The purpose of counting the number of representative distances but not the number of distances Z within the monitoring region AW is to enhance determination precision. Specifically, the purpose herein is to avoid counting also the number of low-reliability data, which is also counted upon counting of the number of distance data.

In the vehicle control system 1 of the present implementation, the image processor 3 performs the determination process if the travel speed of the vehicle is determined to be equal to or higher than a predetermined speed.

In a situation where the vehicle is stopped or is crawling along, there is a high likelihood that an object is present on the road surface in the vicinity of the close-range horizontal center. Accordingly, a representative distance due to the object is likely to appear in comparatively large numbers within the monitoring region AW. In a case where the travel speed of the vehicle is equal to or higher than the predetermined speed, therefore, the determination process is performed to determine thereby the presence or absence of a reflection S in a situation where there is a low likelihood that a representative distance due to an object other than a reflection S is mixed in the monitoring region AW.

The determination precision on the presence or absence of reflection can be enhanced as a result.

In the vehicle control system 1 of the present implementation, the image processor 3 executes an object detection process (three-dimensional object detection process) of detecting an object present in the advance direction of the vehicle, on the basis of a representative distance for each strip region, determines whether or not the object is detected stably within the monitoring region AW in the object detection process, and executes the determination process on the basis of the determination result.

As a result, it becomes possible to execute the determination process if the object is detected stably within the monitoring region AW, and not to execute the determination process if the object is detected unstably. Specifically, it becomes possible to determine the presence or absence of a reflection S in a case where there is a high likelihood that a representative distance due to a reflection S appears within the monitoring region AW, without determining the presence or absence of a reflection S, in a situation where there is a high likelihood that a representative distance due to an object other than a reflection S is mixed in the monitoring region AW.

The determination precision on the presence or absence of reflection S can be accordingly enhanced.

In the vehicle control system 1 of the present implementation, the image processor 3 determines whether the vehicle is turning or not, and executes the determination process on the basis of the determination result.

When the vehicle is turning, a representative distance of an object present on the roadside (for instance a guard rail or roadside wall) and a representative distance due to a reflection S are readily mixed in the monitoring region AW. Accordingly, it is determined whether such a case applies, and the determination process is executed on the basis of the obtained result. Thereby, the determination process can be executed in a case where there is a low likelihood that a representative distance due to an object other than a reflection S is mixed in the monitoring region AW, without executing the determination process in a case where that likelihood is high.

As a result, it becomes possible to enhance the determination precision of the presence or absence of a reflection S.

In the vehicle control system 1 of the present implementation, the image processor 3 determines whether the number of isolated data items of representative distance is large or not, and executes the determination process on the basis of the determination result.

In a situation where the reflection of a surrounding object on the road surface is large, on account of a wet road surface for example during rainy weather, a representative distance due to reflection on the road surface and a representative distance due to a reflection S on the windshield are readily mixed in the monitoring region AW. Therefore, it is determined whether such a case applies or not on the basis of the number of isolated data items of representative distance, and the determination process is executed on the basis of the obtained result. Thereby, the determination process can be executed in a case where there is a low likelihood that a representative distance due to an object other than a reflection S is mixed in the monitoring region AW, without executing the determination process in a case where that likelihood is high.

As a result, it becomes possible to enhance the determination precision of the presence or absence of a reflection S.

In the vehicle control system 1 of the present implementation, the image processor 3 determines whether or not the vehicle is traveling a downhill slope, or whether or not an uphill slope is being imaged by the imaging unit 2, and executes the determination process on the basis of the determination result.

In a case where the vehicle is traveling a downhill slope, or an uphill slope is being imaged by the imaging unit 2, the distance due to an object, for instance painted patches or the like, on the road surface in the vicinity of the close-range horizontal center of the vehicle, is calculated easily, and a representative distance due to an object other than a reflection S appears readily within the monitoring region AW. Therefore, it is determined whether such a case applies or not, and the determination process is executed on the basis of the obtained result. Thereby, the determination process can be executed in a case where there is a low likelihood that a representative distance due to an object other than a reflection S is mixed in the monitoring region AW, without executing the determination process in a case where that likelihood is high.

As a result, it becomes possible to enhance the determination precision of the presence or absence of a reflection S.

In the vehicle control system 1 of the present implementation, the image processor 3 executes an object detection process of detecting an object present in the advance direction of the vehicle, on the basis of a representative distance for each strip region, and is provided with a driving support controller (driving support controller 5) that executes a predefined vehicle control process as a driving support control process, on the basis of the detection result of the object in the object detection process, such that the image processor 3 forcibly terminates the driving support control process on the basis of the result of the determination process.

As a result, the driving support control process can be forcibly terminated in accordance with those instances where a reflection S occurs.

Safety can be increased thereby.

5. Variations

Implementations of the present invention have been explained above, but the present invention is not limited to the concrete examples illustrated above, and may accommodate a number of conceivable variations.

For instance, the driving support control process above has been forcibly terminated on the basis of a determination result of presence or absence of a reflection S, but it is also possible to perform control so that, if it is determined that there is a reflection S, a three-dimensional object that is detected due to the reflection S is excluded from a control target object (for instance, a preceding vehicle) of the driving support control process. This allows preventing the driving support control process from malfunctioning due to the reflection S.

The process illustrated in FIG. 8 for determining the presence or absence of a reflection S can be executed not on a constant basis, but just as long as a predefined driving support control process, for instance the ACC control process, is ON.

Further, the size of the monitoring region AW above was fixed, but it is also possible to adaptively modify the size (in particular, the height) of the monitoring region AW in accordance with, for instance, the travel speed of the vehicle.

The monitoring region AW above was set for an image where the distance Z is taken as the vertical axis, but the monitoring region AW can be set for an image where the j-direction (vertical direction of the captured image) is the vertical axis. The vertical position in the captured image is correlated to the distance Z, and hence the presence or absence of a reflection S can be determined also for an instance where the monitoring region AW is set for an image where the vertical axis is the j-direction.

The invention claimed is:

1. A vehicle control system, comprising:
   an imaging unit that performs stereo-imaging by a pair of cameras that capture an advance direction of a vehicle equipped with the cameras; and
   an image processor that performs image processing for recognizing a vehicle exterior environment, on the basis of a captured image obtained by the imaging unit,
   wherein the image processor executes:
      a distance calculation process of detecting, by pattern matching, corresponding points between a pair of captured images obtained through the stereo-imaging, working out a coordinate shift between the corresponding points as a parallax, and calculating a distance up to each corresponding point, on the basis of the parallax;
      a representative distance calculation process of dividing a distance image, in which a distance of each corresponding point as calculated in the distance calculation process is represented on an image, into a plurality of strip regions that partition the distance image in a vertical direction, and working out, for each strip region, a distance for which a frequency is equal to or higher than a predefined value as a representative distance; and
      a determination process of counting a total number of the representative distances within a target region that is set at a horizontal center section of a bottom end of an image having the distance as a vertical axis and having an image left-right position of the captured image as a horizontal axis, and determining a magnitude relationship between the total number of the representative distances being within the target region and a threshold value.

2. The vehicle control system according to claim 1, wherein the image processor performs the determination process when a travel speed of the vehicle is determined to be equal to or higher than a predetermined speed.

3. The vehicle control system according to claim 2, wherein the image processor:
executes an object detection process of detecting an object present in the advance direction of the vehicle, on the basis of the representative distance for each strip region; and
determines whether or not the object is detected stably within the target region, in the object detection process, and executes the determination process on the basis of the determination result.

4. The vehicle control system according to claim 2, wherein the image processor determines whether the vehicle is turning or not, and executes the determination process on the basis of the determination result.

5. The vehicle control system according to claim 2, wherein the image processor:
executes an object detection process of detecting an object present in the advance direction of the vehicle, on the basis of the representative distance for each strip region; and
determines whether a number of isolated data items that denotes representative distances not grouped in the object detection process is large or not, and executes the determination process on the basis of the determination result.

6. The vehicle control system according to claim 2, wherein the image processor determines whether or not the vehicle is traveling a downhill slope, or whether or not an uphill slope is being imaged by the imaging unit, and executes the determination process on the basis of the determination result.

7. The vehicle control system according to claim 2, wherein the image processor:
executes an object detection process of detecting an object present in the advance direction of the vehicle, on the basis of the representative distance for each strip region; and
includes a driving support controller that executes a predefined vehicle control process as a driving support control process, on the basis of the detection result of the object in the object detection process, and
wherein the image processor forcibly terminates the driving support control process on the basis of the result of the determination process.

8. The vehicle control system according to claim 1, wherein the image processor:
executes an object detection process of detecting an object present in the advance direction of the vehicle, on the basis of the representative distance for each strip region; and
determines whether or not the object is detected stably within the target region, in the object detection process, and executes the determination process on the basis of the determination result.

9. The vehicle control system according to claim 8, wherein the image processor determines whether the vehicle is turning or not, and executes the determination process on the basis of the determination result.

10. The vehicle control system according to claim 8, wherein the image processor determines whether or not the vehicle is traveling a downhill slope, or whether or not an uphill slope is being imaged by the imaging unit, and executes the determination process on the basis of the determination result.

11. The vehicle control system according to claim 8, wherein the image processor:
executes an object detection process of detecting an object present in the advance direction of the vehicle, on the basis of the representative distance for each strip region; and
includes a driving support controller that executes a predefined vehicle control process as a driving support control process, on the basis of the detection result of the object in the object detection process, and
wherein the image processor forcibly terminates the driving support control process on the basis of the result of the determination process.

12. The vehicle control system according to claim 1, wherein the image processor determines whether the vehicle is turning or not, and executes the determination process on the basis of the determination result.

13. The vehicle control system according to claim 1, wherein the image processor:
executes an object detection process of detecting an object present in the advance direction of the vehicle, on the basis of the representative distance for each strip region; and
determines whether a number of isolated data items that denotes representative distances not grouped in the object detection process is large or not, and executes the determination process on the basis of the determination result.

14. The vehicle control system according to claim 8, wherein the image processor:
executes an object detection process of detecting an object present in the advance direction of the vehicle, on the basis of the representative distance for each strip region; and
determines whether a number of isolated data items that denotes representative distances not grouped in the object detection process is large or not, and executes the determination process on the basis of the determination result.

15. The vehicle control system according to claim 1, wherein the image processor determines whether or not the vehicle is traveling a downhill slope, or whether or not an uphill slope is being imaged by the imaging unit, and executes the determination process on the basis of the determination result.

16. The vehicle control system according to claim 1, wherein the image processor:
executes an object detection process of detecting an object present in the advance direction of the vehicle, on the basis of the representative distance for each strip region; and
includes a driving support controller that executes a predefined vehicle control process as a driving support control process, on the basis of the detection result of the object in the object detection process, and
wherein the image processor forcibly terminates the driving support control process on the basis of the result of the determination process.

17. The vehicle control system according to claim 1, wherein the target region is less than a height of the plurality of strip regions, and the target region includes the bottom edge of the image having the distance as the vertical axis and having the image left-right position of the captured image as the horizontal axis.

18. The vehicle control system according to claim 1, wherein a presence or an absence of a reflection on a windshield of a vehicle equipped with the vehicle control system is determined by the determination process.

19. The vehicle control system according to claim 18, wherein the reflection on a windshield denotes a phenomenon where an object placed on the top face of a dashboard of the vehicle is reflected or projected onto the windshield.

20. The vehicle control system according to claim 1, wherein the image processor includes a driving support controller that executes a predefined vehicle control process as a driving support control process, on a basis of the number of the representative distances being in the target region is greater than the threshold value.

* * * * *